Nov. 10, 1964  A. W. KLAMMER  3,156,065

FISHING LINE UNWINDER

Filed Feb. 20, 1963

ALFRED W. KLAMMER
INVENTOR.

BY John L. Woodward
Attorney

United States Patent Office 3,156,065
Patented Nov. 10, 1964

3,156,065
FISHING LINE UNWINDER
Alfred W. Klammer, 1521 73rd Ave. N.,
Minneapolis, Minn.
Filed Feb. 20, 1963, Ser. No. 259,804
3 Claims. (Cl. 43—43.13)

This device relates to fishing tackle and especially to a device for unwinding a twisted fishing line.

It is an object of this invention to provide a device which is adapted to be associated with a fishing line adjacent to its outer end and upon the line being pulled through water, will untwist a twisted fishing line.

It is another object of this invention to provide a device which is adapted to be associated with a fishing line and which is capable of rotating either in a clockwise or a counter-clockwise direction upon being pulled through water.

It is yet another object of this invention to provide a fishing line unwinding device which is readily folded into a flat condition for storage.

Other and further objects and advantages will become apparent from the drawing, detailed description and the appended claims.

One embodiment of the invention is illustrated in the accompanying drawing in which.

Figure 1:
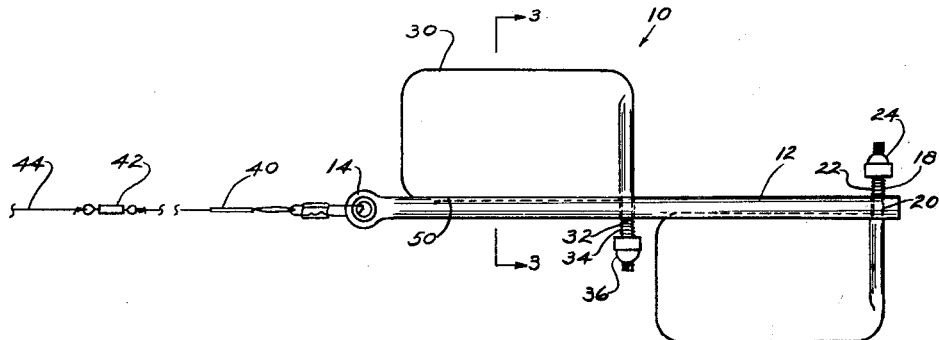
FIGURE 1 is a plan view of the fishing line unwinding device.

The unwinding device 10 which may be made of a suitable plastic comprises an elongated rod member 12 which is provided with an eyelet 14 which may be formed of metal.

The device also includes a first wing 16 which is mounted adjacent to the outer end of the member 12 on one side by means of a short rod 18 provided on the wing 16 and which extends slidably through an aperture 20 in the member 12 to the opposite side. The outer end of the rod 18 is screw threaded. A spring 22 is carried on the outer end of the rod 18 between a nut 24 and the member 12. A second wing 30 is mounted on the member 12 on the side opposite to wing 16 and to the rear of wing 16 by means of a rod 32 provided on the wing 30 and which extends slidably through an aperture in the member 12 to its opposite side. A spring 34 is carried in the outer end of the rod 32 between the member 12 and a nut 36 mounted on the screw threaded outer end of the rod 32.

Slots 33 are formed in the member 12 and extend from the two apertures therein to provide means for holding the wings 16 and 30 in their adjusted positions which are at an angle of 45 degrees with respect to the member 12. The springs 22 and 34, respectively, hold the wings 16 and 30 in their adjusted positions in slots 33 in member 12.

A leader 40 provided with a swivel 42 connects the device 10 with a fishing line 44.

The opposite sides of the member 10 are provided with slots 50 for a purpose set forth hereinafter.

Figure 2:
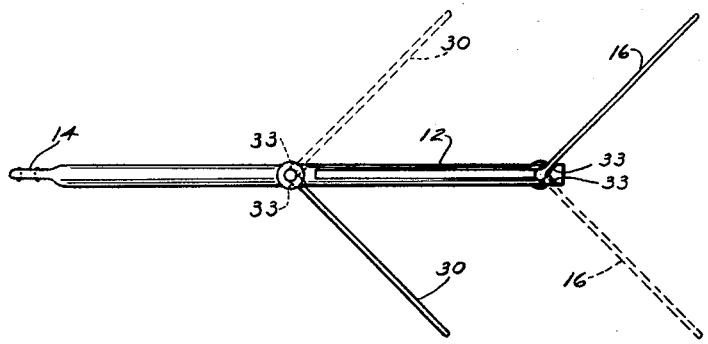
FIGURE 2 is a side elevational view of the fishing line unwinding device.
Figure 3:
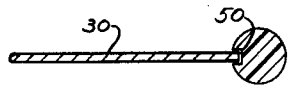
FIGURE 3 is a sectional view taken on line 3—3 of FIGURE 1 disclosing one of the wings of the device in its folded position.

In operation the outer end of rod 18 is pushed toward member 12, compressing spring 22, raising wing 16 out of slot 50, and thus permitting the wing 16 to be moved to the solid line position of FIGURE 2 which is above the member 12 at an angle of 45 degrees. The wing 30 is moved to the solid line position of FIGURE 2, which is below the member 12 at an angle of 45 degrees with respect to member 12 by pushing the outer end of rod 32 toward member 12, thus compressing the spring 34 and thereby lowering the wing 30 out of slot 50. When the wings 16 and 30 are in the solid line position shown in FIGURE 2, the device 10 rotates in a clockwise direction, viewing the wings from the eyelet 14, when pulled through water. When the wings 16 and 30 are moved to the dotted line positions of FIGURE 2, which are at an angle of approximately 45 degrees to the member 12, the device 10 rotates in a counter-clockwise direction, viewing the wings from the eyelet 14, when pulled through the water.

It is well known that nylon lines used in fishing twist and curl up, and the device 10 when attached adjacent to the end of the fishing line and with its wings set at either the solid or dotted line positions shown in FIGURE 2 rotates the line either in a clockwise direction or a counter-clockwise direction to untwist the line.

The wings 16 and 30 may be placed in a flat position with respect to the member 12 and the inner edges of the wings 16 and 30 enter the slots 50 in the opposite edges of the member 12 and with the wings in this position, the device 10 can be safely stored away in an appropriate place.

The wings 16 and 30 are usually set at an angle of 45 degrees with respect to the member 12, but the wings 16 and 30 may be set at other angles which are less than 45 degrees and the device will operate, but the best performance of the device is obtained when the wings 16 and 30 are set at an angle of 45 degrees with respect to the member 12.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A fishing line unwinding device comprising an elongated member, a first adjustable wing pivotally mounted on one side of the member adjacent to one end of the member, a second adjustable wing pivotally mounted on the opposite side of the member to the rear of the first wing, each of said wings having an edge adapted to abut said member, each of the wings being provided with a rod on the edge abutting the member extending slidably through an aperture in the member to the opposite side, each of the rods being screw threaded on its outer end, a nut mounted on the screw threaded end of each of the rods, a spring carried on each rod between the nut and the member for holding the wings in their adjusted positions, said wings being shiftable to either side of the longitudinal axis of said member and frictionally held in adjusted angular relationship with respect to said member for optional reverse rotation of the device.

2. In a device of the character as set forth in claim 1, wherein the member is provided with slot means on its opposite sides for receiving the edge of the wings when adjusted to be in alignment with the member.

3. In a device of the character as set forth in claim 1, wherein the member is provided with slot means for holding the wings in their adjusted positions.

References Cited in the file of this patent

UNITED STATES PATENTS

| 2,484,162 | Golembeski | Oct. 11, 1949 |
| 2,563,386 | Wight | Aug. 7, 1951 |

FOREIGN PATENTS

| 561,103 | France | July 27, 1923 |
| 23,482 | Great Britain | Nov. 24, 1899 |